United States Patent [19]

Kira et al.

[11] 4,333,071

[45] Jun. 1, 1982

[54] SELF-CANCELLING APPARATUS FOR VEHICLE TURN INDICATORS

[76] Inventors: Hiroshi Kira, 6135 Fairview Pl., Aguora, Calif. 91301; Verne W. Bauman, 887 Conestoga Cir., Newbury Park, Calif. 91320

[21] Appl. No.: 176,073

[22] Filed: Aug. 7, 1980

[51] Int. Cl.³ .......................... B60Q 1/40; H01H 3/16
[52] U.S. Cl. .................................. 340/56; 200/61.31; 307/10 LS; 315/81; 340/62; 340/73
[58] Field of Search .................. 340/56, 62, 669, 73; 315/80, 81; 307/10 LS; 200/61.3, 61.31, 61.32

[56] References Cited

U.S. PATENT DOCUMENTS

| | | | |
|---|---|---|---|
| 2,147,630 | 2/1939 | Metcalf | 200/61.31 |
| 2,343,778 | 3/1944 | Leonard | 200/61.31 |
| 3,316,533 | 4/1967 | Kell | 340/56 |
| 3,555,506 | 1/1971 | Daws | 340/56 |
| 3,562,799 | 2/1971 | Creager et al. | 340/56 |
| 3,876,976 | 4/1975 | Cross, Jr. | 340/73 |
| 4,058,797 | 11/1977 | Sekiguchi et al. | 340/56 |
| 4,128,770 | 12/1978 | Okazaki | 340/56 X |

Primary Examiner—John W. Caldwell, Sr.
Assistant Examiner—Joseph E. Nowicki
Attorney, Agent, or Firm—Michael A. Painter

[57] ABSTRACT

An electrical translation circuit for detecting the initiation and termination of a turn or change in direction of a motorcycle, automobile, boat or other like vehicle and the cancellation of the turn indicator for that vehicle. Sensors detect relative steering angle, distance and velocity of the vehicle processing same to cancel a manually operated turn indicator. The detected change in steering angle is coupled with processed signals indicative of appropriate forward movement of the vehicle. The combined signals initiate a cancellation signal which will terminate the vehicle turn indicator signal. The vehicle turn indicator signal will not be reset until there has been an appropriate retracement of the steering angle coupled with appropriate forward movement of the vehicle thereby precluding inadvertent reset signals arising from lane changes or vehicle stoppage during the turning operation.

10 Claims, 8 Drawing Figures

SELF-CANCELLING APPARATUS FOR VEHICLE TURN INDICATORS

BACKGROUND OF THE INVENTION

1. Field of the Invention

The present invention generally relates to vehicle control circuits and, more particularly, to apparatus for controlling the termination of direction turn signals.

2. Prior Art

With the increased mobility of the world's population due to vehicular travel, it has become evident that advances are necessary to provide for improved vehicle safety features. In particular, the need to provide improved directional signal control apparatus for vehicles in general, and motorcycles specifically, is of prime importance. Although the present invention is equally applicable to automobiles and like vehicles which employ rotating steering columns which can easily employ directional signal shafts, the present invention will be discussed in terms of its primary application for motor driven cycles which shall be understood to include motorcycles, mopeds, motor scooters, etc. The latter types of vehicles are unique in the sense that there is no full rotation of the steering mechanism to execute a lane change or turn, but to the contrary, such changes in directions are often, if not always, accomplished through the use of weight allocation. The result of the change in weight allocation will cause a deflection of the motor driven cycle from its quiescent vertical oreintation with little movement of the handlebar and coupled steering column.

The prior art discloses several rudamentary types of devices which are used to control the duration of the directional signal used on the motor driven cycle. The simplest of these devices is merely a manual switch operated by the user to indicate the start and stop of a left or right hand lane change or turn. Other types of simple devices are based solely on time and distance. The operator of the motor driven cycle initiates a manual switching mechanism to start the directional flashers. The detectors which combine input signals based on time and distance will reset the directional signal irrespective of the dynamics of the operation of the motor driven cycle. The inadequacies of these devices are obvious. The elementary manual switches are clearly deficient since the operator can totally neglect to reset the switches after he has completed the lane change or turn. With respect to the circuit based on time and distance, since there is no input which is based on the actual dynamics of the motor driven cycle, the directional signals can be reset even though the operator has not completed and possibly has not even started the lane change or turn.

There are a number of devices disclosed by the prior art which seek to automatically cancel a turn signal by monitoring specific aspects of the vehicle's operation. In U.S. Pat. No. 4,125,827, the self-cancelling turn signal apparatus operates in response to an upshift of the transmission. It is clear that although a turn may occur within an appropriate time interval encompassing a change in gears, there is no assurance that such combination will occur. U.S. Pat No. 4,030,066 discloses a self-cancelling turn signal which is controlled by a gyroscope. This device utilizes the precession movement of the gyroscope and, in particular, the return movement of same. It is therefore clear that it is a change in direction which is the operative input to this device, an input which can be defective as a result of the actual dynamics of the cycle. U.S. Pat. No. 3,876,976 discloses a self-cancelling apparatus for cycles which is responsive to changes in the gravitational and inertial forces experienced by the vehicle due to inclination from its normally upright position or due to its change in direction. As with the other devices disclosed by the prior art, this device does not fully accomplish its intended purpose since the dynamics of the cycle can produce inputs which would cancel the vehicle turn indicator signal despite the fact that the turn has not in fact been completed and may not have even been started.

The present invention substantially resolves the problems which are inherent in the devices disclosed in the prior art. The present invention detects small changes in the turn angle of the steering wheel as well as producing signals which are responsive to the velocity of the cycle as well as the distance being traveled. In operation, a cycle can make a 90° turn with only small deflections in the turn angle of the steering column. In addition, the cycle operator may change lanes prior to making the actual turn and, in fact, stop the cycle totally prior to making a turn but after the turn indicator is activated. The present invention generates a signal responsive to a change in the rotational angle of the steering column. When the operator has initiated a manual vehicle turn signal which corresponds to the detected change in the steering angle, a signal is generated which is responsive to the turn, the initiation of the signal starting the commencement of the cancellation cycle. In order to appropriately deal with the dynamics of the cycle, a signal responsive to the distance being traveled by the cycle is generated. The signal responsive to the distance traveled must exist for a sufficient interval to insure that an inadvertent cancellation signal is not produced. When the time interval has been met, the output of a digital counter will turn on a bistable element to initiate a cancellation signal. In addition, to avoid an inadvertent cancellation signal during that period of time when the cycle is halted, the counter will not be permitted to advance in the absence of signals responsive to minimum distance traveled and the rate thereof, i.e., velocity. It can therefore be seen that the inadequacies of the devices disclosed by the prior art are solved by the present invention.

SUMMARY OF THE INVENTION

The present invention comprises a self-cancelling apparatus for vehicle turn indicator signals. Although the present invention is applicable to substantially all vehicles which utilize rotating steering columns, the present invention will be discussed in terms of its primary application to motorcycles. It has been determined that there is a specific relationship between steering angle displacement, radius of turn and the wheel base of the vehicle.

The following is a good approximation of the relationship:

$$\Delta \approx 360/2r\pi/w$$

where:
 $\Delta$ = steering angle displacement
 r = radius of turn
 w = vehicle wheelbase Based on the above equation, a steering column will be displaced by approximately 2° of arc during a turn having a radius of 150' when considering a vehicle with a 60" wheel base. The present invention is based upon the criteria that a 2° change in the displacement of the steering column is adequate to provide indicia sufficient to constitute the initiation of a turn.

The steering angle sensor is mounted intermediate the rotating front fork assembly of the motorcycle and the stationery collar of the steering column. A slip ring secured to the front fork assembly has a pair of isolated, conductive surfaces affixed about a portion of the circumference thereof. The two conductive surfaces are electrically separated by a predetermined displacement angle. A switch contact is secured to the stationery collar, a conductive end thereof being aligned equidistant from and between the two conductive surfaces on the slip ring. When the fork assembly is rotated, a signal is generated by the slip ring-switch combination which is responsive to the turn. Depending upon the direction in which the slip ring is rotated, it can be determined when the minimum steering change has been exceeded and the direction in which the cycle is being turned.

A velocity/distance sensor produces a signal responsive to the distance being traveled by the cycle as well as the relative speed thereof. A speedometer cable translates the distance the cycle is traveling per unit of time. An aperture is disposed through the speedometer cable and a phototransistor/light emitting diode combination is used to measure the rotation of the cable and therefore the speed of the cycle and the distance traveled thereby.

The cancellation apparatus is initiated by the manual operation of the vehicle turn signal. Once the operator has selected the right or left directional signal, the steering angle sensor is monitored. A turn signal is generated which is responsive to the presence of the turn command as well as the detected steering angle. A digital counter used to monitor the distance sensor is activated only when the steering angle sensor indicates that the steering angle change exceeds a predetermined angle and the motorcycle has been detected as traveling an appropriate distance. Upon meeting all requirements dictated by the dynamics of the motorcycle, a binary latch is set to initiate the cancellation of the vehicle turn signal indicator.

It is therefore an object of the present invention to provide an improved self-cancelling apparatus for vehicle turn indicators.

It is another object of the present invention to provide a self-cancelling apparatus for vehicle turn indicators which is fully responsive to a change in the steering angle of the vehicle.

It is still yet another object of the present invention to provide a self-cancelling apparatus for vehicle turn indicators which is responsive to the distance traveled and the velocity of the vehicle during a turn.

It is yet another object of the present invention to provide a self-cancelling apparatus for vehicle turn indicators which is simple and inexpensive to fabricate.

The novel features which are believed to be characteristic of the invention, both as to its organization and method of operation, together with further objectives and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

BRIEF DESCRIPTION OF THE DRAWING

FIG. 7 is a schematic, circuit diagram of the present invention self-cancelling apparatus for vehicle turn indicators.

DESCRIPTION OF THE PRESENTLY PREFERRED EMBODIMENT

Figure 1:
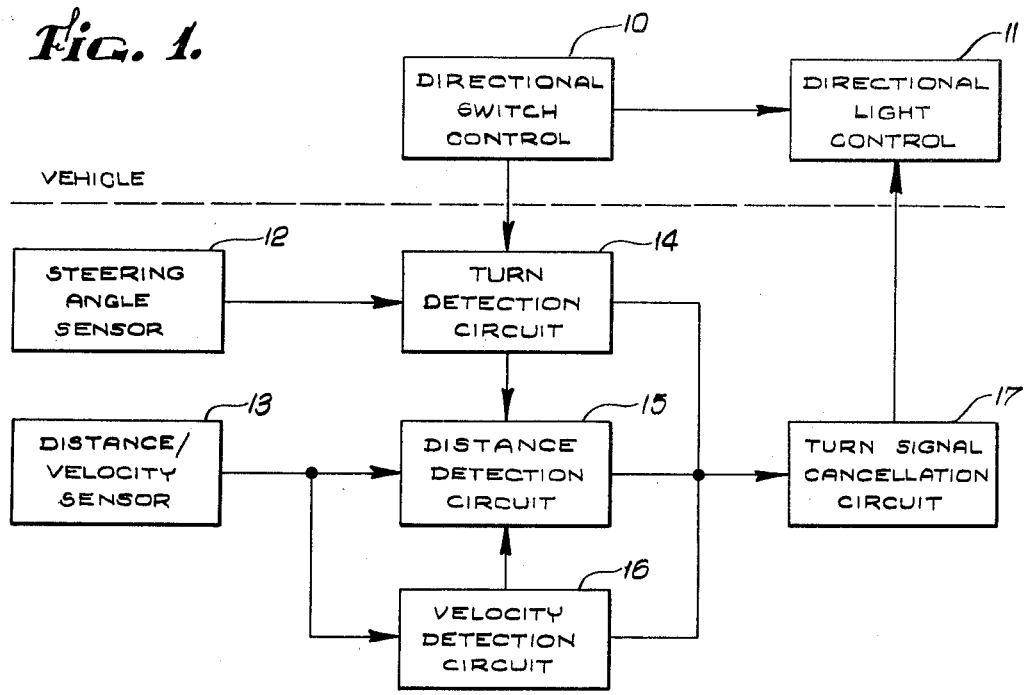
FIG. 1 is a schematic, block diagram of the present invention self-cancelling apparatus for vehicle turn indicators.

An understanding of the present invention can be best seen by reference to FIG. 1 wherein a schematic, block diagram of the elements of the present invention are shown. The present invention comprises an electrical translation circuit for automatically cancelling vehicle turn signals in a manner which is responsive to the dynamics of a motor driven cycle and the manner in which it is operated. Although the present invention is equally applicable to substantially all vehicles which utilize rotating steering columns, the present invention will be described in connection with its primary application to motor driven cycles.

Referring now to FIG. 1, directional switch control 10 is a conventional unit which is mounted upon the motorcycle which will output indicia indicating the direction in which the motorcycle operator intends to turn the vehicle. Directional switch control 10 turns on directional light control 11 which will provide a visual indication to other vehicles as to the projected path of the vehicle. Directional switch control 10 and directional light control 11 typically include conventional mechanical and/or electromechanical devices to provide for switching and temporary storage of the projected turn information, the structure thereof not being part of the present invention.

Steering angle sensor 12 monitors the change in steering angle which would be defined by the relative position between the front fork steering assembly of the motorcycle and the frame of the vehicle. Steering angle sensor 12 monitors the steering angle of the vehicle and produces an electrical signal responsive to this change. It has been theoretically and empirically determined that the steering angle displacement of 2° or greater will be indicative of a projected vehicle turn. In the present invention, steering angle sensor 12 produces a binary signal which will change states when the steering angle displacement equals or exceeds 2° of arc. It is clear that the signal level which triggers the output of a steering angle displacement change is subject to variations, 2° of arc being selected as an optimum value.

Distance and velocity sensor 13 monitors the forward movement of the vehicle and produces electrical signals which are responsive to the distance traveled by the vehicle and the rate of change of that distance. Since velocity is merely the first derivative of distance and is defined as the rate of change of distance per unit time, it is clear that velocity can be determined through the implementation of this function with the result that distance traveled could be calculated by integrating the output. For the purpose of simplicity, the present invention directly monitors distance traveled and velocity thereof and produces a signal responsive to these measurements. As will be discussed hereinbelow, the preferred form of the present invention monitors rotation of a speedometer cable which is conventionally coupled to an axle or other rotating component of a vehicle. It would be obvious to one having skill in the art that other conventional methods of such measurement could be utilized.

When the user activates directional switch control 10 to command directional light control 11 to visually indicate a right or left turn, a switched signal responsive to same is transferred to turn detection circuit 14 by directional switch control 10. Turn detection circuit 14 processes the turn commands output by directional switch control 10 and the signal responsive to steering angle change output by steering angle sensor 12. When the actual direction of turn indicated by steering angle sensor 12 coincides with the turn command output by directional switch control 10, turn detection circuit 14 outputs a signal which logically indicates that a turn has been commanded and has been initiated.

Distance detection circuit 15 monitors the output signals from distance/velocity sensor 13. As stated hereinabove, one of the criteria used for operation of the present invention comprises the need to establish that a minimum distance has been traveled during the turn to insure that the turn is actually taking place. This criteria is to avoid the inadvertent cancellation of the turn indication when the operator stops the vehicle prior to actually completing the turn. Distance detection circuit 15 insures that the signal responsive to distance has surpassed the minimum requirement necessary to insure that the vehicle is, in fact, moving through a turn.

As stated, the primary objective of the present invention is to cancel or otherwise deactivate a turn indicator after the actual completion of a turn. The present invention ignores or otherwise resets signals which would arise from intermediate lane changes, stoppage of the vehicle or other changes in velocity which would falsely indicate the termination of the turn. Velocity detection circuit 16 insures that a cancellation signal will not be produced if the vehicle stops during the execution of its turn. As will be described hereinbelow, when the vehicle stops, the distance/velocity sensor 13 will produce no output signal responsive to movement. The absence of the output signal will reset the appropriate counter, the counter being restarted only when data indicates the turn is being carried out. As stated hereinabove, since distance and velocity measurements can either be made individually, or one can be calculated from the other, circuits which are conventional and known in the art for such conversions can be utilized.

Turn signal cancellation circuit 17 processes the output of turn direction circuit 14, distance detection circuit 15 and velocity detection circuit 16. Turn signal cancellation circuit 17 will output a signal cancelling the turn indication stored by directional light control 11 only when: (1) turn detection circuit 14 indicates that the minimum steering angle change has been made in the direction commanded; (2) minimum distance requirements have been exceeded and are indicated by the distance detection circuit 15; and (3) minimum velocity requirements have been exceeded as indicated by velocity detection circuit 16; (4) turn detection circuit 14 indicates that steering angle displacement is less than minimum steering angle representing termination of the turn.

Figure 2:
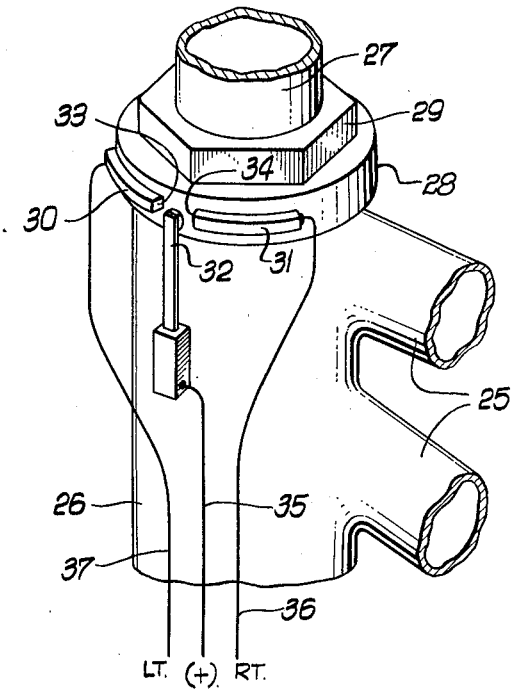
FIG. 2 is a perspective view of a preferred form of the steering angle sensor shown mounted upon the steering assembly of a motorcycle.

An understanding of the preferred form of steering angle sensor 12 can be best gained by reference to FIG. 2. As mentioned hereinabove, the frame 25 of the motorcycle is integral with collar 26. The front fork assembly of the steering assembly of a motorcycle incorporates a shaft 27 which is rotatable within collar 26. Shaft 27 is integral with the handlebars of the motorcycle and is rotatably coupled within collar 56 through conventional means. A slip ring 28 is secured to shaft 27 and is held in place through hexagonal nut 29 in a manner which will permit slip ring 28 to rotate relative to collar 26. The rotation of slip ring 28 relative to collar 26 provides data to establish the steering angle displacement between the front fork assembly of the motorcycle and frame 25.

Conductive surfaces 30 and 31 are secured to and electrically insulated from the peripheral surface of slip ring 28. As shown in FIG. 2, conductive surfaces 30 and 31 lie along the periphery or circumference of slip ring 28, rotation thereof reflecting the relative change in steering angle between frame 25 and the front fork assembly. Switch contact 32 is disposed equidistant between the ends 33 and 34 of conductive surfaces 30 and 31 respectively when the longitudinal axis of frame 25 and the front fork assembly are aligned, i.e., the motorcycle will travel in a straight line. Ends 33 and 34 are separated by an arc which is double that which has been defined as optimal to establish the angular displacement of the steering assembly relative to the frame when a turn is initiated. Where 2° of arc is used as the optimum angular displacement necessary to establish a turn, ends 33 and 34 of conductive surfaces 30 and 31 will be separated by approximately 4° of arc. As stated, switch contact 32 bisects the angular separation between ends 33 and 34 of conductive surfaces 30 and 31 respectively.

If shaft 27 is rotated clockwise during the execution of a right hand turn, electrical contact will be established between switch contact 32 and conductive surface 31, as well as attached leads 35 and 36 respectively. If shaft 27 is rotated counterclockwise upon the initiation of a left hand turn, there will be electrical contact between switch contact 32 and conductive surface 30 as well as attached leads 35 and 37 respectively. It can therefore be seen that the use of slip ring 28 provides means to identify when the angular displacement between the steering assembly and frame 25 exceeds the minimum change required to be indicative of a turn as well as the direction in which the turn is being made.

Figure 3:
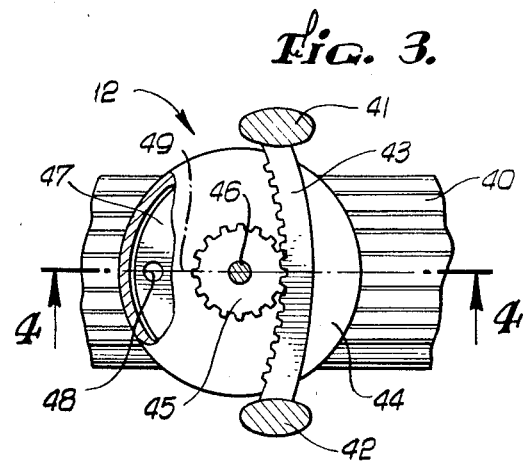
FIG. 3 is a top plan, schematic view of another form of the steering angle sensor shown mounted in relation to the front fork steering assembly of a motorcycle.
Figure 4:
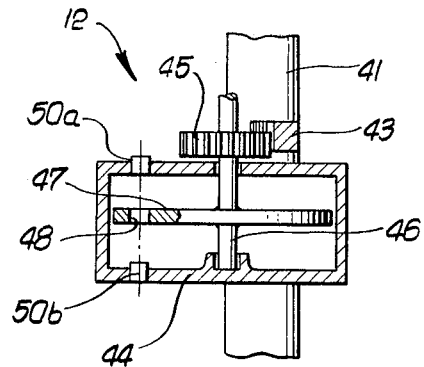
FIG. 4 is a side elevation, schematic view of the steering angle sensor shown in FIG. 3.

An understanding of another form of steering angle sensor 12 can be best gained by reference to FIGS. 3 and 4. As stated hereinabove, steering angle displacement is measured by rotational movement of the forward fork assembly relative to the frame 25 of the vehicle. As shown in FIG. 3, the schematic depiction of the front tire 40 is shown in relationship to the two elements 41 and 42 of the fork assembly. An arcuate gear-faced member 43 is disposed intermediate elements 41 and 42 of the fork assembly. As mentioned hereinabove, the fork assembly will rotate with respect to the frame 25 of the motorcycle. Referring to FIG. 4, the housing 24 for steering angle detector 12 is mounted in a fixed relationship with respect to the motorcycle frame 25, the physical coupling thereto not being part of the present invention. Gear 45 is mounted upon axle 46 and journeled through housing 44 through the use of appropriate bearings. Disc 47 is securely mounted upon axle 46 within housing 24, disc 47 rotating in a manner determined by the rotation of gear 45. The rotation of the fork assembly with respect to the frame of the motorcycle will cause arcuate gear-faced member 43 to move relative to axle 46 transmitting rotational force to gear 45. It is therefore seen that the rotation of disc 47 will be directly responsive to a rotational displacement of the fork assembly 41, 42 with relation to the frame 25 of the motorcycle to which housing 44 is directly coupled.

An aperture 48 is disposed through disc 47 parallel to axle 46. When the fork assembly defined by elements 41 and 42 have no angular displacement with respect to the frame of the vehicle, i.e., the vehicle will travel on a straight line, aperture 48 will lie on the longitudinal axis 49 of the vehicle or its equivalent. Steering angle displacement is measured by the altered position of aperture 48 with respect to longitudinal axis 49 or another reference point. A conventional phototransistor/light emitting diode combination 50(a), 50(b) is securely mounted upon housing 44 on opposite sides of disc 47. The photgransistor/light emitting diode combination is aligned with aperture 48 such that when aperture 48 lies along longitudinal axis 49, the optical path between elements 50(a) and 50(b) is completed. When aperture 48 is rotated about axle 46 and is thereby deflected away from longitudinal axis 49, or other reference point, the direction and angular magnitude of the displacement is determined by the direction of and size of aperture 48. As mentioned hereinabove, the phototransistor/light emitting diode combination 50(a), 50(b) produces a signal responsive to a steering angle displacement which exceeds approximately 2° of arc. It is also clear that disc 47 can be replaced by an encoded disc and appropriate translation apparatus.

Figure 5:
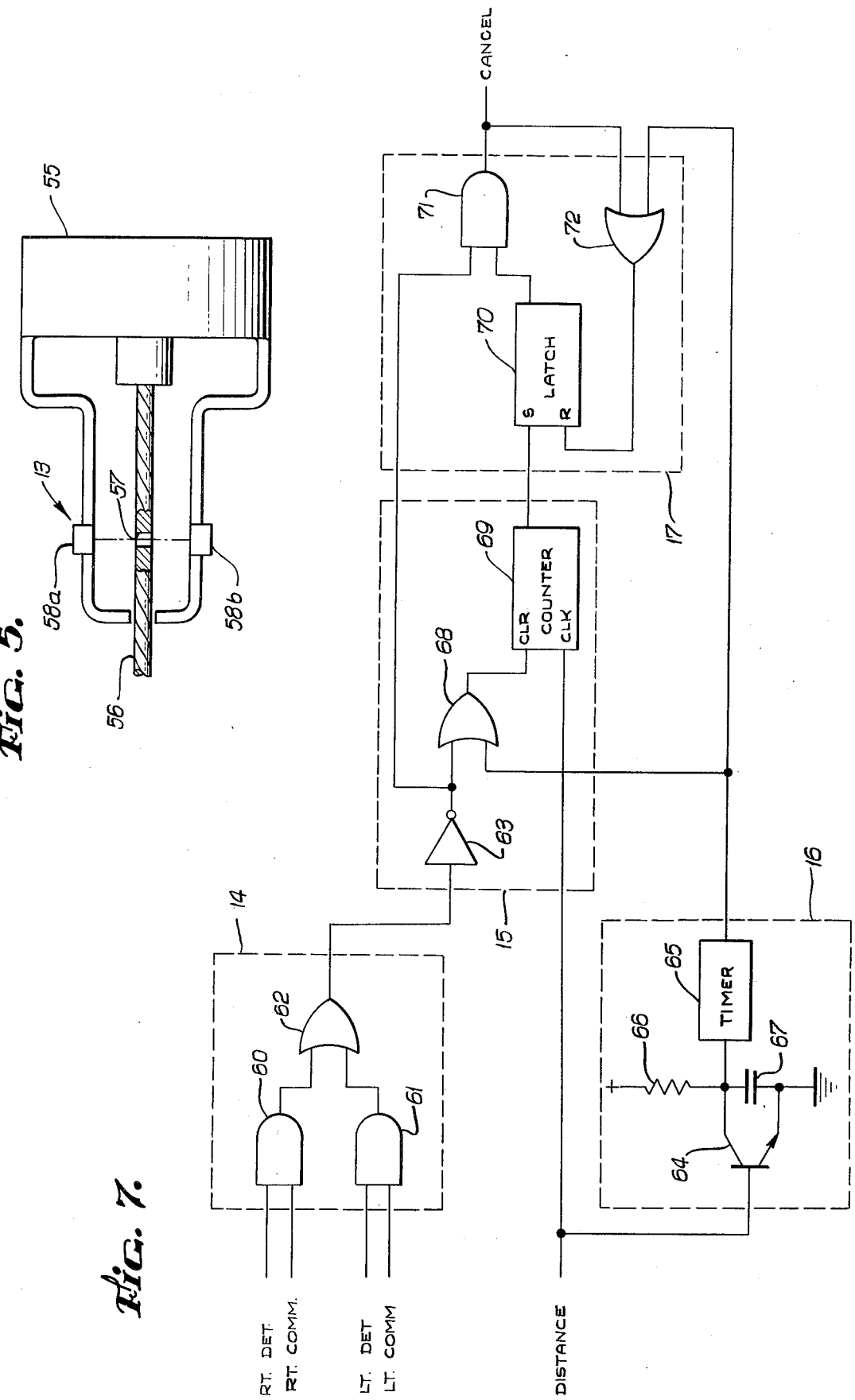
FIG. 5 is a schematic view of the distance/velocity sensor utilized in accordance with the present invention.

An understanding of distance/velocity sensor 13 can be best gained by reference to FIG. 5 wherein a schematic view of the preferred form thereof is shown. A motorcycle typically uses a conventional speedometer 55 to provide the operator with a visual indication of the speed at which the motorcycle is traveling. Although any number of conventional methods of implementing speedometer 55 can be used, the preferred form is shown in FIG. 5. Cable 56 is typically coupled to one of the wheels of the motorcycle, cable 56 rotating at a speed which is proportional to the speed of the motorcycle. Cable 56 is connected to the mechanical translating elements of the speedometer 55 to provide for the visual reading. When used by the present invention, an aperture 57 is disposed through cable 56 and a conventional phototransistor/light emitting diode combination 58(a), 58(b) aligned with aperture 57 can be used. It is also clear that an encoded disc can be employed along with appropriate translation apparatus in place of aperture 57 and the translation combination 58(a), 58(b).

Since the rotation of cable 56 defines the movement of a specified distance by the motorcycle, a directly translated output from phototransistor/light emittng diode combination 58(a), 58(b) will define and provide an electrical signal responsive to the distance being moved by the motorcycle. Since the number of revolutions of cable 56 will define distance, measurement of the time between a half revolution of cable 56 will permit a measurement of velocity. This is a direct calculation since the velocity measurement is merely distance traveled per unit of time. As stated previously, although the use of cable 56 permits direct measurement of distance and velocity, it is clear that other conventional methods of measuring units of distance and distance per unit of time can be utilized, such as a commutator and brush, and magnetic encoders.

Figure 6:
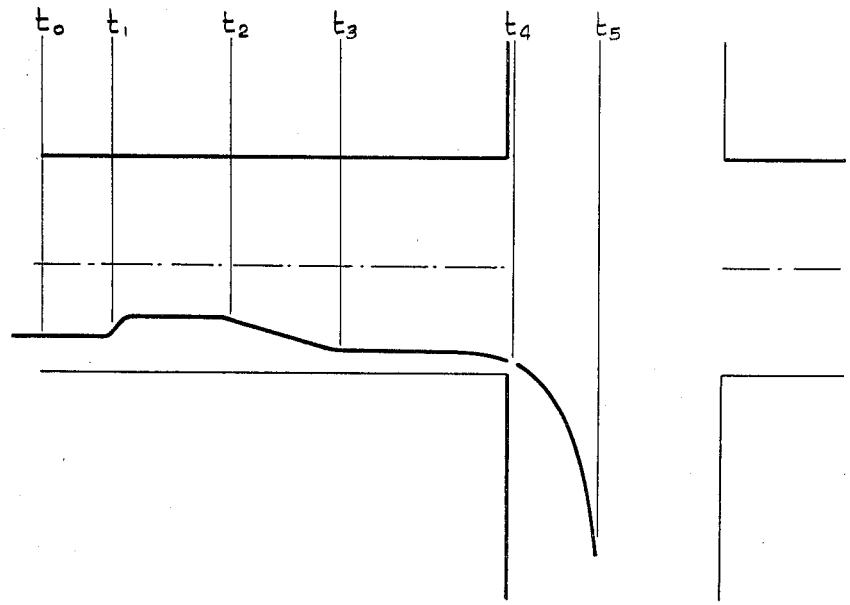
FIG. 6 is a schematic view of the proposed path to be taken by a motorcycle incorporating the present invention self-cancelling apparatus for vehicle turn indicators.

The operation of the present invention can be best gained by reference to FIGS. 6 and 7. FIG. 6 illustrates a schematic depiction of the path which would be taken by a motorcycle in preparation for making a turn. The time interval $t_0$-$t_5$, represents the events which could typically take place prior to, during and at the termination of a turn, all of which are pertinent to the ability of the present invention to automatically cancel the turn indicator signals upon the termination of the turn. The present invention avoids inadvertent cancellation during the time interval because of normal events associated with the operation of the motorcycle. $t_0$ represents the point in time when the operator elects to turn on the directional indicator to indicate a right turn. At time $t_1$, there is an inadvertent movement of the motorcycle to the left which could result from another vehicle, an animal in the roadway, or any other event which would cause the motorcycle to turn in a direction opposite from that eventually intended. At time $t_2$, the motorcycle begins to change lanes back to the right in preparation for the turn. At time $t_3$, the motorcycle proceeds in a straight direction toward the initiation of the eventual turn. At time $t_4$, the motorcycle halts in preparation for the turn. Such an event would typically occur to view oncoming traffic. At time $t_5$, the turn is complete, the motorcycle having changed direction by 90°.

Figure 8:
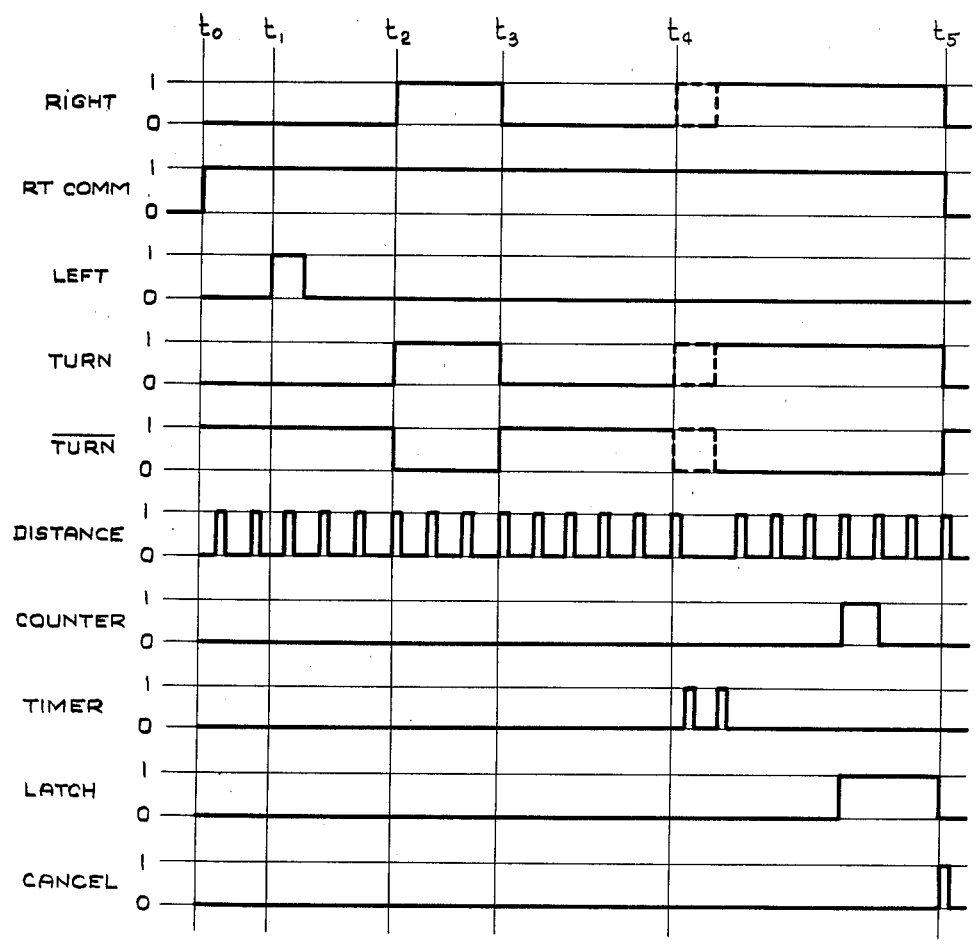
FIG. 8 is a timing diagram of a portion of the elements of the circuit shown in FIG. 7 operating on the schematic path illustrated in FIG. 6.

FIG. 8 constitutes a schematic timing diagram of the various elements of the circuit shown in FIG. 7. Referring now to FIG. 7, turn detection circuit 14 comprises a pair of AND gates 60 and 61, the outputs of which are connected to OR gate 62. The inputs to AND gate 60 are "right turn detected" which comprises the output of steering angle sensor 12 (lead 36) and "right turn command" which is derived from the output of directional switch control 10. The inputs to AND gate 61 are "left turn detected" and "left turn command" which are derived from steering angle sensor 12 (lead 37) and directional switch control 10 respectively. The output of OR gate 62 is connected to signal inverter 63. Velocity detection circuit 16 is connected to the output of distance/velocity sensor 13. The signal output of the phototransistor/light emitting diode combination 58(a), 58(b) will constitute a series of pulses which will be output from distance/velocity sensor 13 when cable 56 is rotating. Velocity detection circuit 16 acts as an astable multivibrator which can be turned off. When the time between distance pulses is in excess of a predetermined interval, the voltage at the collector of transistor 64 will reach a triggering level sufficient to initiate an output from conventional timing circuit 65. When the time interval between adjacent pulses output from distance/velocity sensor 13 is less than the time constant established by resistor 66 and capacitor 67, the voltage at the collector of transistor 64 will not rise to the triggering level inhibiting the output of timer 65.

The output of velocity detection circuit 16 and the output of inverter 63 are connected to OR gate 68, the output of OR gate 68 being connected to the clear input terminal of digital counter 69. When enabled, counter 69 will count a defined number of pulses output by distance/velocity sensor 13 in order to establish that the motorcycle has traveled at least the minimum distance required. When digital counter 69 has been incremented to overflow, binary latch 70 will be turned on. The output of binary latch 70 and inverter 63 are input to AND gate 71, the output of turn signal cancellation circuit 17 producing a cancellation signal to the directional light control 11 upon the simultaneous occurance of these two signals.

To avoid inadvertent cancellation signals, digital counter 69 will be cleared when velocity detection circuit 16 determines that the time interval between adjacent pulses output from distance/velocity sensor 13 is too great, i.e., timer 65 produces output pulse. This could occur when the motorcycle halts or its speed is severely retarded during the sequence of a planned turn. By clearing counter 69, latch 70 of turn signal cancellation circuit 17 will not be set. The output of velocity detection circuit 16 and the cancellation signal output from AND gate 71 are connected to OR gate 72 to reset latch 70 setting up turn signal cancellation circuit 17 for a new operation.

As stated, FIG. 8 illustrates the timing diagram of the pertinent components of the circuit set forth in FIG. 7 during the schematic path illustrated in FIG. 6. For the purpose of discussion, the timing diagram shown in FIG. 6 defines the high state of the signals of the "true" state of the logical components. In addition, FIG. 7 is shown to be an asychronous system with the change of states of elements occurring at the change in the logical state of the component from low to high. It is, of course, clear to those having skill in the art that the circuit of FIG. 7 could utilize a clock and incorporate alternative logical systems.

Referring now to FIG. 6 and FIG. 8, at time $t_0$, signal "RT. COMM." is shown going to the true state. This is derived from directional switch control 10 and indicates the operator's election to visually indicate that a right turn is to be made. At time $t_1$, the motorcycle makes an inadvertant movement to the left, it being assumed that slip ring 28 (FIG. 2) has rotated in a manner to cause switch 32 to electrically contact conductive surface 30. Since the input to AND gate 61 identified as "LT. COMM." is not in the true state, the signal LEFT shown in FIG. 8 will temporarily be in the true state but have no effect on the remainder of the circuit shown in FIG. 7. At time $t_2$, the motorcycle begins movement to the right thereby causing the signal RIGHT to go from the false to the true state. Since the logical inputs to AND gate 60 are now both true, the output of OR gate 62 will go true. This is represented in FIG. 8 by the signal TURN. In order for a true cancellation signal to be activated, counter 69 must be incremented until it overflows. The signal identified as $\overline{\text{TURN}}$ will change state and is intended to clear the counter at the end of a turn. The pulses output by distance/velocity sensor representing distance traveled will increment digital counter 69, the signals being connected to the CLK input of counter 69. As shown in FIG. 6, the interval between $t_2$ and $t_3$ is insufficient to cause the counter to overflow since it was merely a short lane change. At time $t_3$, i.e., the completion of the lane change, the rise of the signal $\overline{\text{TURN}}$ rises clearing counter 69. This has avoided the output of an inadvertent cancellation signal which would have resulted if digital counter 69 had overflowed and set binary latch 70. Between time $t_3$ and $t_4$, the motorcycle is traveling in a straight path. This is illustrated by the return of the signal RIGHT to the false state. During the interval $t_3$ to $t_4$, the signal TURN has also returned to the false state.

As stated previously, it is necessary that a false cancellation signal not be issued after the time the operator has manually initiated the turn indicator but prior to the completion of the actual turn. At time $t_4$, the motorcycle has stopped, typically to view oncoming traffic. As can be seen by the signal DIST, there are missing pulses. This has occurred since cable 56 is no longer rotating and the motorcycle is not moving in the forward direction. Since the absence of the signal DIST at the base of transistor 64 will permit the signal input to timer 45 to reach the triggering level, a signal will appear at the output of timer 65 in the manner typically illustrated by an astable multivibrator. This is illustrated by the signal TIMER shown in FIG. 8. The pulses appearing at the output of timer 65 will clear digital counter 69 and reset binary latch 70 if the latter has been set. At time $t_4$, despite the fact that the motorcycle is not moving, the steering angle displacement may or may not exceed the 2° of arc necessary to initiate an output from steering angle sensor 12. This is represented by the hatched portion of the signals RIGHT, TURN and $\overline{\text{TURN}}$ shown at time $t_4$. When the motorcycle commences movement toward completion of the turn, when coupled with the return of the signal TURN to the true state, digital counter 69 will commence incrementing based upon the pulses shown by the signal DIST. Although the number is one of choice, the signal designated as COUNTER, after counting four consecutive DIST pulses overflows to set the binary latch as represented by the signal LATCH. When the signal RIGHT returns to a false state at time $t_5$ as a result of the steering angle displacement falling below 2° of arc, the cancellation pulse will result resetting binary latch 70.

The sole cancellation pulse occurs at time $t_5$. The present invention has avoided the issuance of a cancellation pulse during lane changes in both directions as well as during an interval during which the motorcycle was stopped. It can therefore be seen that the present invention provides a self-cancelling apparatus for vehicle turn indicators which is truely responsive to the dynamics of the motorcycle and the manner in which it is operated.

We claim:

1. A self-cancelling apparatus for vehicle indicator signals for a vehicle having a rotating steering member which rotates relative to the vehicle frame and turn signal means selectively operable for activating and deactivating the vehicle turn signal means comprising:
   (a) steering angle sensor means for detecting the change in the relative angle between the rotating steering member and the frame of the vehicle;
   (b) angle sensor processing means for producing a binary electrical output signal having on and off states responsive to the change in the relative angle between the rotating steering member and the frame of the vehicle, said on state occurring when said change exceeds a predetermined angle, said off state occurring when the change does not exceed the predetermined angle, said angle sensor processing means being coupled to said steering angle sensor means;

(c) distance sensor means for sensing the distance traveled by the vehicle, said distance sensor means being coupled to the vehicle;

(d) distance sensor processing means for producing an electrical output signal responsive to a predetermined distance having been traveled by the vehicle, said distance sensor processing means being coupled to the distance sensor means; and (e) cancellation means for deactivating the turn signal means when the binary electrical output signal of said angle sensor processing means has switched from the on to the off state and the electrical output signal of said distance sensor processing means coincides with the off state, said cancellation means being coupled to the outputs of said angle sensor processing means and said distance sensor processing means.

2. A self-cancelling apparatus for vehicle indicator signals as defined in claim 1 wherein said steering angle sensor means comprises:

(a) a slip ring secured to and rotatable with the rotating steering member relative to the vehicle frame;

(b) a pair of conductive surfaces radially secured about and electrically insulated from said slip ring, ends of said conductive surfaces being separated by a predetermined angular displacement; and (c) a switching member, a first end thereof being coupled to said vehicle frame, the second end thereof being disposed between the separated ends of said conductive surfaces whereby said switching member will contact a conductive surface when the steering member is rotated.

3. A self-cancelling apparatus for vehicle indicator signals as defined in claim 2 wherein the second end of said switching member is equidistant between the separated ends of said conductive surfaces when the rotating steering member is aligned with the vehicle frame.

4. A self-cancelling apparatus for vehicle indicator signals as defined in claim 1 wherein said steering angle sensor means comprises:

(a) an arcuate geared member coupled to the steering member of the vehicle;

(b) a gear rotatable about a central axle and being interfaced with said arcuate geared member, said central axle being coupled to the frame of the vehicle whereby said gear will rotate when the steering member rotates relative to the frame of the vehicle;

(c) a disc securely mounted about said axle parallel to said gear, an aperture being disposed through the disc parallel to the axle; and (d) translation means for monitoring the position of said aperture relative to the frame of the vehicle.

5. A self-cancelling apparatus for vehicle indicator signals as defined in claim 1 wherein said distance sensor means comprises:

(a) a speedometer incorporating a rotatable cable coupled to the vehicle and rotating at a speed proportional to the movement of the vehicle, said cable having an aperture disposed through the diameter of said cable perpendicular to the axis thereof; and (b) translation means for monitoring the rotation of the cable, said translation means being in juxtaposition to the aperture through said rotatable cable.

6. A self-cancelling apparatus for vehicle indicator signals as defined in claim 1 wherein said angle sensor processing means produces an output signal responsive to the change in the relative angle between the steering member and a fixed reference point on the vehicle frame when said change is equal to or exceeds 2° of arc.

7. A self-cancelling apparatus for vehicle indicator signals as defined in claim 1 including velocity processing means for producing an electrical output signal responsive to the distance per unit of time traveled by the vehicle, said velocity processing means being coupled to said distance sensor means, said cancellation means being coupled to the outputs of said angle sensor processing means, distance sensor processing means and said velocity processing means, said cancellation means deactivating the turn signal means when the processed electrical output signals of said angle sensor processing means, distance sensor processing means and velocity processing means are responsive to predetermined levels of steering angle displacement, distance traveled and distance traveled per unit of time.

8. A self-cancelling apparatus for vehicle indicator signals for use with a motorcycle employing a rotating steering member which rotates relative to the motorcycle frame and turn signal means which are selectively operable to activate and deactivate said turn signal means comprising:

(a) a steering angle sensor including a slip ring secured to and rotatable with the rotating steering member relative to the motorcycle frame, a pair of conductive surfaces radially disposed about and secured to the periphery of said slip ring, ends of said conductive surfaces being separated by a predetermined angular displacement, and a switching member, a first end thereof being coupled to said motorcycle frame, the second end thereof being disposed between the separated ends of said conductive surfaces whereby said switching member will contact a conductive surface when the steering member is rotated;

(b) a distance sensor comprising a speedometer incorporating a rotatable cable coupled to the motorcycle, said cable rotating at a speed which is proportional to the movement of the motorcycle, and translation means for monitoring the rotation of the cable, said translation means producing an electrical output signal, the frequency of which is responsive to the rotation of the cable;

(c) turn sensor means for producing an electrical output signal responsive to the motorcycle turn signal means and said steering angle sensor, said turn sensor means being coupled to the motorcycle turn signal means and said steering angle sensor;

(d) counter means for determining the distance traveled by the motorcycle, and producing an electrical output signal when a predetermined distance has been traveled, said counter means being coupled to said distance sensor and being responsive to the output signal from said translation means;

(e) a binary latch connected to said counter means, said binary latch being set upon the production of an electrical output signal by said counter means; and (f) cancellation means for producing an electrical output signal to reset the motorcycle turn signal means upon the completion of a turn, said cancellation means being coupled to the turn sensor means, the output of said binary latch and the motorcycle turn signal means, the electrical output signal produced by said cancellation means being applied to said turn signal means responsive to the electrical output signals of said turn sensor means and said binary latch.

9. A self-cancelling apparatus for vehicle indicator signals as defined in claim 8 including a velocity detector comprising electrical translating means for producing an electrical signal responsive to the frequency of the output signal of said distance sensor, said electrical translating means coupled to said counter whereby said counter is reset when the frequency of said output signal falls below a predetermined level.

10. A self-cancelling apparatus for vehicle indicator signals as defined in claim 8 wherein the second end of said switching member is equidistant between the separated ends of said conductive surfaces when the rotating steering member is aligned with the motorcycle frame.

* * * * *